United States Patent
Nobusawa et al.

(10) Patent No.: US 9,484,761 B2
(45) Date of Patent: Nov. 1, 2016

(54) DARK CURRENT CUTOFF DEVICE AND DARK CURRENT CUTOFF METHOD

(75) Inventors: Hisashi Nobusawa, Odawara (JP); Ayumu Kubota, Machida (JP); Hiromasa Akaho, Hadano (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 360 days.

(21) Appl. No.: 14/116,936

(22) PCT Filed: Feb. 29, 2012

(86) PCT No.: PCT/JP2012/055042
§ 371 (c)(1),
(2), (4) Date: Nov. 11, 2013

(87) PCT Pub. No.: WO2012/153562
PCT Pub. Date: Nov. 15, 2012

(65) Prior Publication Data
US 2014/0077620 A1    Mar. 20, 2014

(30) Foreign Application Priority Data
May 12, 2011    (JP) .................... 2011-106824

(51) Int. Cl.
*H02J 7/00*    (2006.01)
*B60R 16/03*    (2006.01)
*B60R 16/033*    (2006.01)

(52) U.S. Cl.
CPC ............ *H02J 7/0063* (2013.01); *B60R 16/03* (2013.01); *B60R 16/033* (2013.01); *Y10T 307/74* (2015.04)

(58) Field of Classification Search
CPC .... H02J 7/0063; B60R 16/03; B60R 16/033; Y10T 307/74
USPC .......................................................... 307/125
See application file for complete search history.

(56) References Cited

U.S. PATENT DOCUMENTS

2009/0066494 A1    3/2009    Ishikawa

FOREIGN PATENT DOCUMENTS

| JP | 10-70843 A | 3/1998 |
|---|---|---|
| JP | 2002-235599 A | 8/2002 |
| JP | 2006-8057 A | 1/2006 |
| JP | 2006-008057 A | 1/2006 |
| JP | 2008-126812 A | 6/2008 |
| JP | 2008-179221 A | 8/2008 |
| JP | 2009-67135 A | 4/2009 |

*Primary Examiner* — Hal Kaplan
(74) *Attorney, Agent, or Firm* — Foley & Lardner LLP (57) ABSTRACT

A dark current cutoff device (1) includes: a battery (10) configure to perform electrical power supply to a load (20); a cutoff switch (32), which is provided between the battery (10) and the load (20), cuts off the electrical power supply to the load (20) at a time of being opened, and supplies electrical power to the load (20) at a time of being closed; a failure recording unit (21) that determines and records a case where the load (20) does not operate as a failure of the load (20); and an open/close determining unit (41) that determines that the cutoff switch (32) is opened; and a recording prohibiting unit (22) configure to prohibit, in a case where the cutoff switch (32) is determined to be opened by the open/close determining unit (41), the failure recording unit (21) from determining and recording the failure.

4 Claims, 5 Drawing Sheets

DARK CURRENT CUTOFF DEVICE AND DARK CURRENT CUTOFF METHOD

TECHNICAL FIELD

The present invention relates to a dark current cutoff device and a dark current cutoff method.

BACKGROUND ART

In recent years, electrical components have tended to be increased in a vehicle, and a dark current has tended to be increased during transportation and storage of the vehicle. Accordingly, in order to prevent a battery from running out during the transportation and storage of the vehicle, there has been proposed a technology for leaving a short-circuit pin or the like of a fuse, which is provided between loads and the battery, in a state of being pulled out (for example, refer to Patent Literatures 1 and 2). Moreover, a device has been proposed, in which a relay is provided between the loads and the battery, and this relay is opened (for example, refer to Patent Literature 3).

CITATION LIST

Patent Literature

[PTL 1] Japanese Patent Laid-Open Publication No. 2008-126812

[PTL 2] Japanese Patent Laid-Open Publication No. 2008-179221

[PTL 3] Japanese Patent Laid-Open Publication No. H10-70843 (published in 1998)

SUMMARY OF INVENTION

Here, among the loads, there is a load that records failure information. That is to say, among the loads, there is a load that determines, as a failure, such a case where the unit concerned is not supplied with electrical power and cannot operate normally, and then records failure information indicating that effect. Here, in a conventional device, in such a case of pulling out the short-circuit pin or the like in order to cut off the dark current, then the load having a function to perform failure recording processing undesirably performs the failure recording processing since the supply of the electrical power is cut off. If the failure recording processing is undesirably performed as described above, then in a dealer or the like, an operation of deleting the failure information is required at the time of selling the vehicle. Meanwhile, if the short-circuit pin or the like is not pulled out so that the failure recording processing cannot be performed, then the dark current cannot be cut off, and a cutoff effect for the dark current is lowered.

The present invention has been made in order to solve such conventional problems as described above. It is an object of the present invention to provide a dark current cutoff device and a dark current cutoff method, which do not require the operation of deleting the failure information, and are capable of enhancing the cutoff effect for the dark current.

In a dark current cutoff device according to a first aspect of the present invention, a failure recording unit determines and records a case where a load does not operate as a failure of the load. Moreover, an open/close determining unit determines that an open/close unit, which is provided between a battery and the load, cuts off electrical power supply to the load at a time of being opened, and supplies electrical power to the load at a time of being closed, is opened. A recording prohibiting unit prohibits, in a case where the open/close unit is determined to be opened, the failure recording unit from determining and recording the failure.

In a dark current cutoff device according to second aspect of the present invention, a failure recording unit determines and records a case where a load does not operate as a failure of the load. Moreover, an open/close determining unit determines that an open/close unit, which is provided between a battery and the load, cuts off electrical power supply to the load at a time of being opened, and supplies electrical power to the load at a time of being closed, is opened. In a case where the open/close unit is determined to be opened, a recording prohibiting unit supplies the electrical power, which is supplied from the battery, to the load by an alternative route that does not pass through the open/close unit, and prevents the case from being determined and recorded as the failure by the failure recording unit.

DESCRIPTION OF EMBODIMENTS

Figure 1:
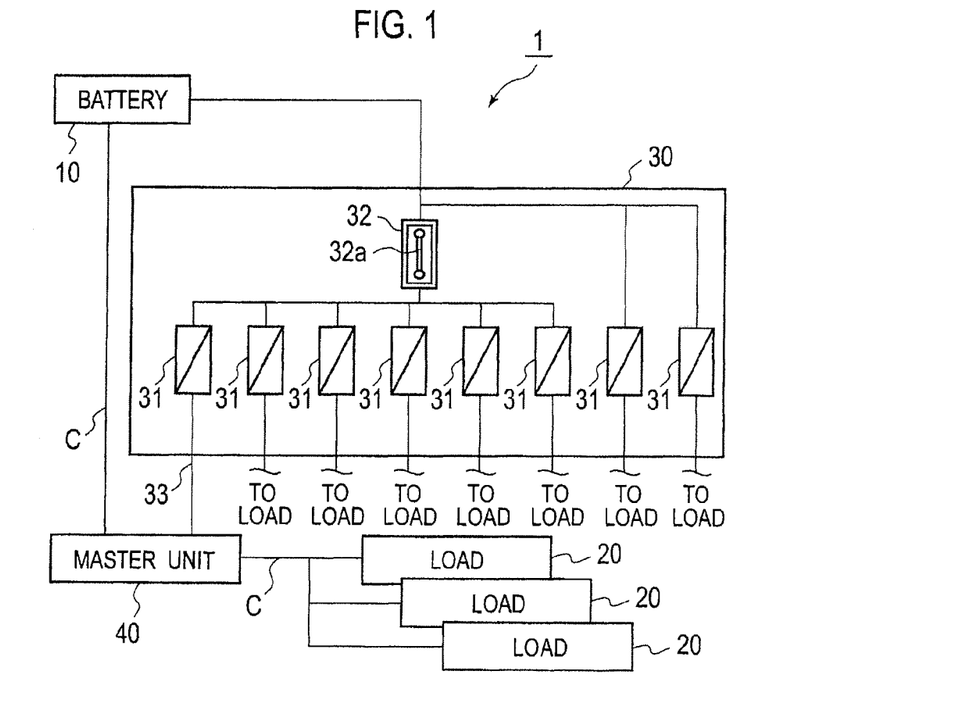
FIG. 1 is a schematic configuration diagram of a dark current cutoff device according to a first embodiment of the present invention.

A description is made of a first embodiment as a preferred embodiment of the present invention based on the drawings. FIG. 1 is a schematic configuration diagram of a dark current cutoff device 1 according to this embodiment. As shown in FIG. 1, a dark current cutoff device 1 is composed of: a battery 10; loads 20; a fuse block 30; and a master unit 40.

The battery 10 is a unit that supplies electrical power to the loads 20. The loads 20 are a variety of instruments such as meters, which are mounted on a vehicle. Among the loads 20, there are a large number of loads such as an audio instrument, to which it is not necessary to supply the electrical power at the time of transporting and storing the vehicle. The fuse block 30 is a block that includes a large number of fuses 31 which protect the loads 20 from a larger current than a rated current in the case where the larger current concerned flows through the loads 20. Such a current from the battery 10 is supplied through this fuse block 30 to the respective loads 20.

Moreover, the fuse block 30 includes a cutoff switch 32 for limiting the supply of the electrical power to a part of the loads 20. This cutoff switch 32 is provided between the battery 10 and the loads 20, and includes a short-circuit pin 32a. The short-circuit pin 32a is a pin that cuts off the supply of the electrical power to the loads 20 at the time of being pulled out (that is, at the time of being opened), and in addition, supplies the electrical power to the loads 20 at the time of being inserted (that is, at the time of being closed). In general, at the time of transporting and storing the vehicle, the short-circuit pin 32a is pulled out, and the current supplied from the battery 10 is not allowed to be supplied to a part of the loads 20. In such a way, a dark current at the time of transporting and storing the vehicle is cut off.

However, among the loads 20, there is a load that performs failure recording processing. That is to say, among the loads 20, there is a load that determines, as a failure, such a case where the unit concerned is not supplied with the electrical power and cannot operate normally, and then records failure information indicating that effect. Therefore, if the short-circuit pin 32a is pulled out, such a load 20 performs the failure recording processing. Therefore, a dealer or the like must delete the failure information at the time of selling the vehicle. Meanwhile, if a connection relationship with the battery 10 is maintained for the load 20 as described above at the time of transporting and storing the vehicle, then the dark current flows, resulting in lowering of a cutoff effect for the dark current. In this connection, the dark current cutoff device 1 according to this embodiment includes the following configuration.

Figure 2:
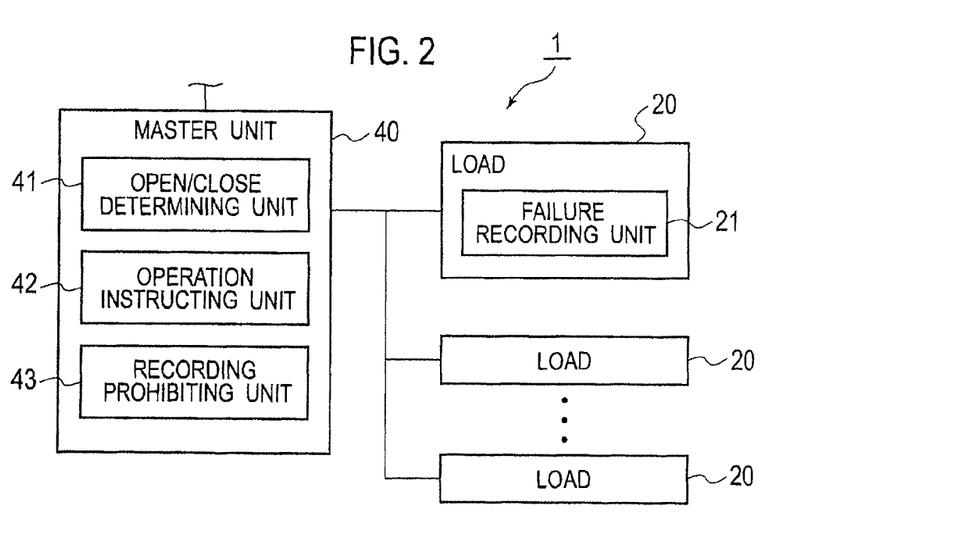
FIG. 2 is a block diagram showing main portions of the dark current cutoff device according to the first embodiment.

FIG. 2 is a block diagram showing main portions of the dark current cutoff device 1 according to this embodiment. As shown in FIG. 2, the master unit 40 includes an open/close determining unit 41; an operation instructing unit (prohibition instructing unit) 42; and a recording prohibiting unit 43. Moreover, the load 20 includes a failure recording unit 21 that performs the above-mentioned failure recording processing.

The failure recording unit 21 is a unit that determines a case where the load 20 does not operate normally as a failure of the load 20, and records that effect. The open/close determining unit 41 is a unit that determines that the cutoff switch 32 is opened, that is, that the short-circuit pin 32a is pulled out. As shown in FIG. 1, the master unit 40 is connected to the battery 10 through the cutoff switch 32 and a signal line 33, and the open/close determining unit 41 can determine whether the cutoff switch 32 is in an opened state or a closed state based on a voltage value inputted from the signal line 33.

The recording prohibiting unit 43 is a unit that, in the case where it is determined by the open/close determining unit 41 that the cutoff switch 32 is opened, supplies the load 20, which performs the failure recording processing, with the electrical power, which is supplied from the battery 10, by an alternative route C that does not pass through the cutoff switch 32.

With such a configuration, even the load 20 that performs the failure recording processing can eliminate a necessity for an operation of deleting the failure information at the time of selling the vehicle without recording the failure information at the time when the cutoff switch 32 is opened.

Figure 3:
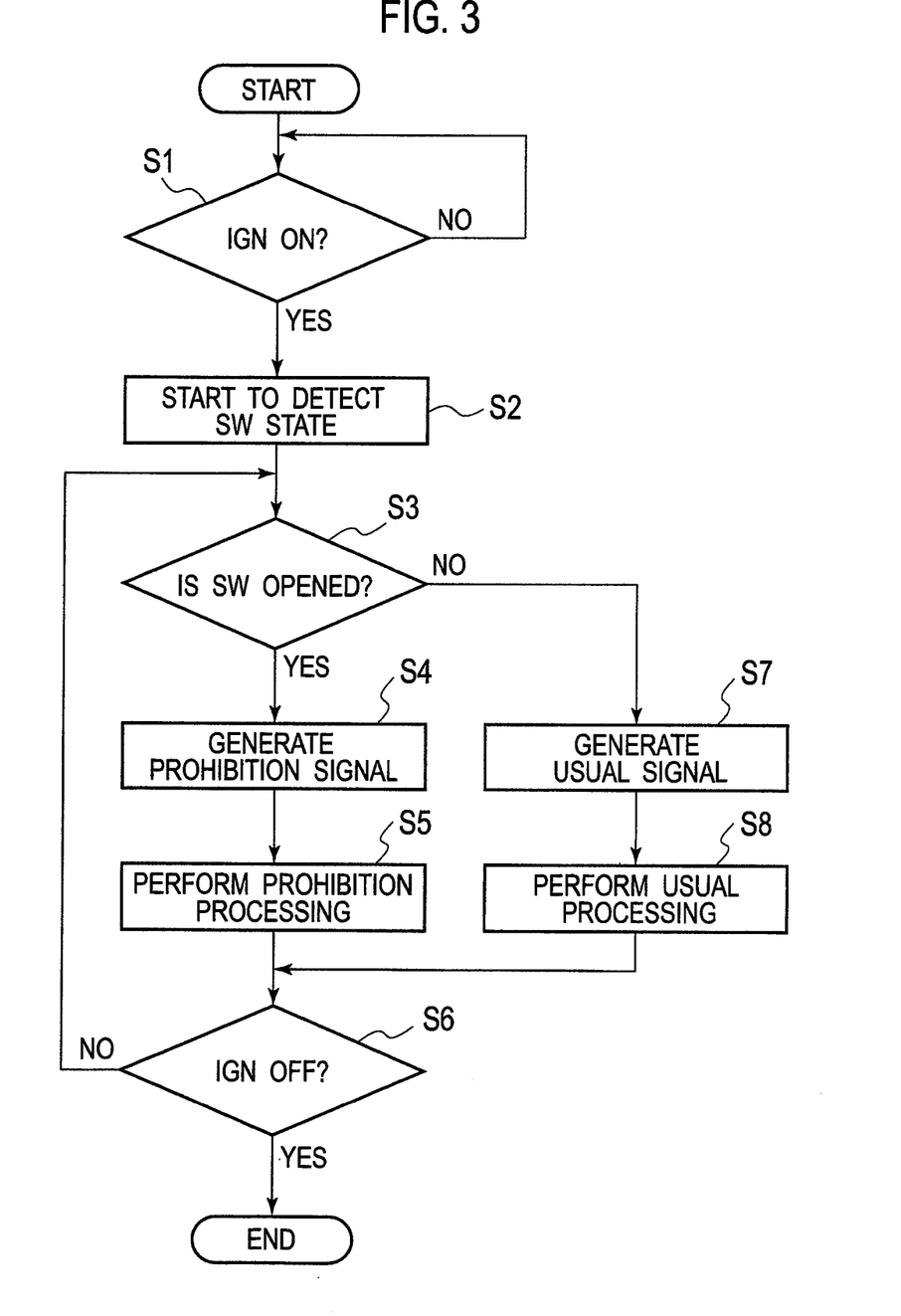
FIG. 3 is a flowchart showing a dark current cutoff method according to the first embodiment.

Next, a description is made of a dark current cutoff method according to this embodiment with reference to ta flowchart. FIG. 3 is a flowchart showing the dark current cutoff method according to this embodiment.

First, as shown in FIG. 3, the master unit 40 determines whether or not an ignition switch is turned on (S1). In the case where it is determined that the ignition switch is not turned on (S1: NO), this processing is repeated until it is determined that the ignition switch is turned on.

Meanwhile, in the case where it is determined that the ignition switch is turned on (S1: YES), then the open/close determining unit 41 starts detection as to whether the cutoff switch 32 is in the opened state or the closed state (S2). Then, the open/close determining unit 41 continues to detect the state of the cutoff switch 32 until the ignition switch is turned off.

Thereafter, the open/close determining unit 41 determines whether or not the cutoff switch 32 is in the opened state (S3). In the case where it is determined that the cutoff switch 32 is in the opened state (S3: YES), the operation instructing unit 42 generates a prohibition signal that instructs prohibition of the failure recording processing (S4). Then, the recording prohibiting unit 43 executes prohibition processing for prohibiting the failure recording processing (S5). That is to say, the recording prohibiting unit 43 supplies the electrical power to the load 20, which performs the failure recording processing, by the alternative route C. In such a way, even if the short-circuit pin 32a is pulled out, the electrical power is supplied to the load 20 that performs the failure recording, and the failure recording processing is not performed. Moreover, for the loads 20 which do not perform the failure recording processing, supply routes of the electrical power thereto are shut off, and accordingly, the dark current directed thereto is also cut off.

Subsequently, the master unit 40 determines whether or not the ignition switch 40 is turned off (S6). In the case where the ignition switch is not turned off (S6: NO), the processing proceeds to Step S3. Meanwhile, in the case where it is determined that the ignition switch is turned off (S6: YES), the processing shown in FIG. 3 is ended.

Moreover, in the case where it is determined that the cutoff switch 32 is not in the opened state (S3: NO), the operation instructing unit 42 generates a usual signal that instructs a usual operation that does not prohibit the failure recording processing (S7). Thereafter, the recording prohibiting unit 43 does not execute the prohibition processing for prohibiting the failure recording processing, but executes the usual operation (S8). In such a way, in the case where there is a failure in the load 20 and the supply of the electrical power is cut off at the time when the vehicle is used by a user, the failure information is recorded by the failure recording unit 21, and at the time when the vehicle is repaired in the dealer or the like, the load 20 which is in the failure can be easily specified from the failure information. Thereafter, the processing proceeds to Step S6.

As described above, in accordance with the dark current cutoff device 1 and the dark current cutoff method according to this embodiment, in the case where it is determined that the cutoff switch 32 is opened, the electrical power supplied from the battery 10 is supplied to the load 10 by the alternative route C that does not pass through the cutoff switch 32, and such an operation is prevented that it is determined that there is a failure by the failure recording unit 21 and that the failure information is recorded thereby. Therefore, even if the short-circuit pin 32a is pulled out, the electrical power continues to be supplied to the load 20 that performs the failure recording processing, and the failure recording processing is not performed. Meanwhile, supply paths of the electrical power to the loads which do not perform the failure recording processing are shut off, and the dark current is cut off. Hence, in accordance with the dark current cutoff device 1 and the dark current cutoff method according to this embodiment, the operation of deleting the failure information is not required, and an effect of cutting off the dark current can be enhanced.

Moreover, the cutoff switch 32 is provided, which cuts off the supply of the electrical power to the loads 20 and supplies the electrical power to the loads 20 by pulling out and inserting the short-circuit pin 32a. Alternatively, for example, it is also conceived to classify the loads 20 in advance into the load 20 that performs the failure recording processing and the loads 20 which do not perform the failure recording processing, and to provide the cutoff switches 32 individually for the load 20 that performs the failure recording processing and the loads 20 which do not perform the failure recording processing. Then, it is conceived to pull out the short-circuit pin 32a from the fuse block 32 for the loads 20 which do not perform the failure recording processing. However, in this case, an operator must determine the cutoff switch 32 from which the short-circuit pin 32a should be pulled out, and there is a possibility that an error may occur in an operation of pulling out the short-circuit pin 32a. As opposed to this, in this embodiment, even if the cutoff switches 32 are provided, it is not necessary for the operator to determine the cutoff switch 32 from which the short-circuit pin 32a should be pulled out, and the dark current can be appropriately cut off even if such a switch as the cutoff switch 32, which manually shuts off the supply path of the electrical power, is provided.

Next, a description is made of a second embodiment of the present invention. A dark current cutoff device and a dark current cutoff method according to the second embodiment are similar to those of the first embodiment; however, are partially different therefrom in configuration and processing method. A description is made below of different points from the first embodiment.

Figure 4:
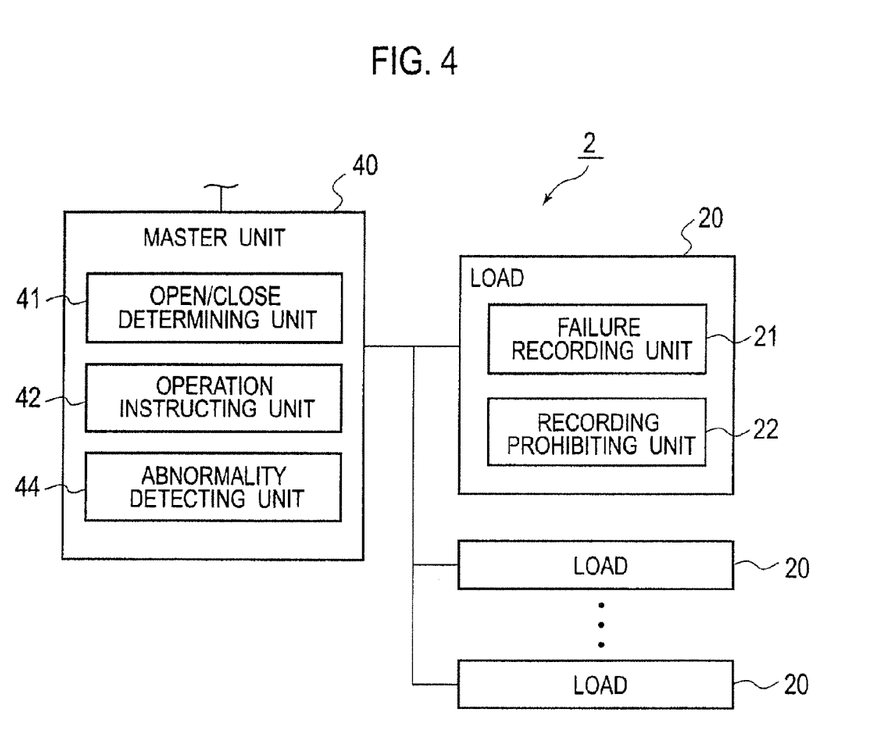
FIG. 4 is a block diagram showing main portions of a dark current cutoff device according to a second embodiment of the present invention.

FIG. 4 is a block diagram showing main portions of a dark current cutoff device 2 according to the second embodiment. The dark current cutoff device 2 shown in FIG. 4 does not supply the electrical power to the load 20, which performs the failure recording processing, at the time of opening the cutoff switch 32 as in the first embodiment, but to the load 20 that performs the failure recording processing, prohibits a function to perform the failure recording processing.

Specifically, in the second embodiment, in the case where it is determined that the cutoff switch 32 is opened by the open/close determining unit 41, the operation instructing unit 42 transmits, to the load 20, the prohibition signal to the effect of prohibiting the failure recording processing. Moreover, the load 20 includes a recording prohibiting unit 22. Upon receiving the prohibition signal from the operation instructing unit 42, the recording prohibiting unit 22 of the load 20 prohibits the failure information from being recorded by the failure recording unit 21 as a result that it is determined thereby that there is a failure. That is to say, the recording prohibiting unit 22 masks such a function of the failure recording processing by the failure recording unit 21.

Moreover, in the second embodiment, the master unit 40 includes an abnormality detecting unit 44 in place of the recording prohibiting unit 43. The abnormality detecting unit 44 is a unit that detects abnormality of the cutoff switch 32. Details of this abnormality detecting unit 44 are described later.

Moreover, in the case where the abnormality of the cutoff switch 32 is detected by the abnormality detecting unit 44, the recording prohibiting unit 22 does not execute the operation of prohibiting the failure recording processing. Therefore, as a result that the abnormality of the cutoff switch 32 is erroneously determined as the open of the cutoff switch 32, the failure recording processing is not prohibited in the case where the failure recording processing must be originally performed, and accordingly, the failure recording processing can be normally executed.

Figure 5:
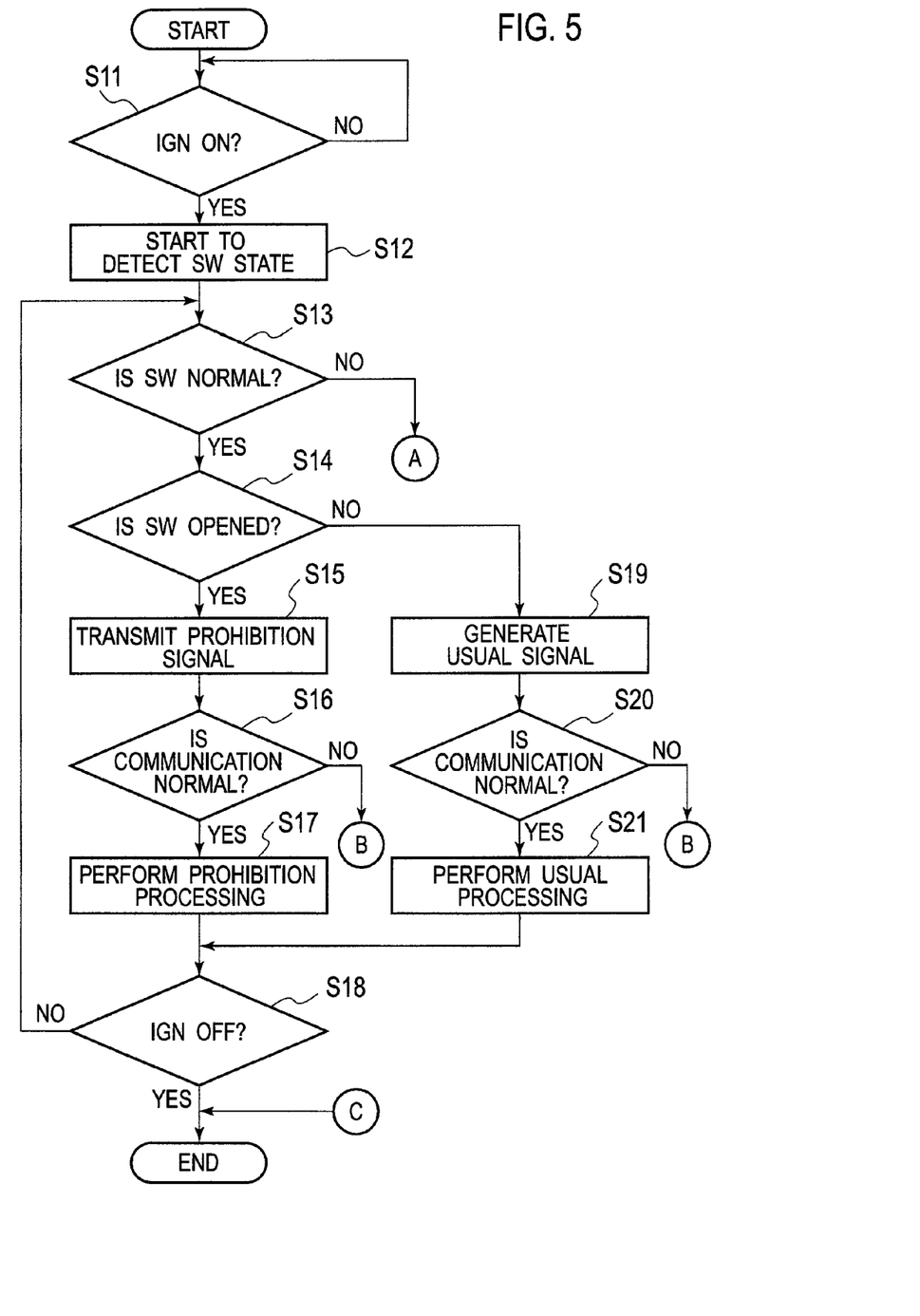
FIG. 5 is a first flowchart showing a dark current cutoff method according to the second embodiment.
Figure 6:
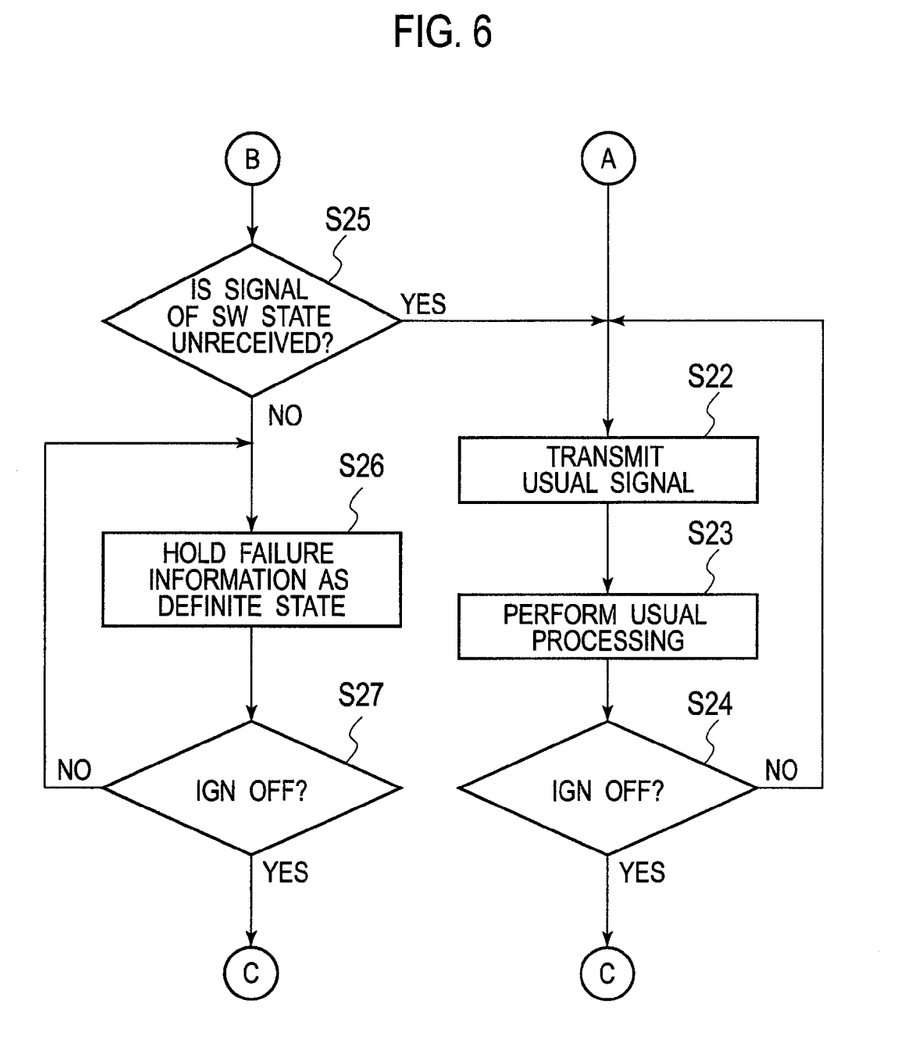
FIG. 6 is a second flowchart showing the dark current cut off method according to the second embodiment.

Next, a description is made of the dark current cutoff method according to the second embodiment with reference to flowcharts. FIG. 5 and FIG. 6 are the flowcharts showing the dark current cutoff method according to this embodiment. Note that processing of Steps S11 and S12, which are shown in FIG. 5, is similar to that of Steps S1 and S2, which are shown in FIG. 3, and accordingly, a description thereof is omitted.

In Step S13, the abnormality detecting unit 44 determines whether or not the abnormality occurs in the cutoff switch 32 (S13). A description is made of an example of a method for determining the abnormality of the cutoff switch 32. First, in this embodiment, as described above, at the time when the cutoff switch 32 is opened, the failure recording processing is prohibited (masked). Therefore, for example, if the load 20 has no failure, then at the time when the cutoff switch 32 is opened, the failure recording processing is masked, and then at the time when the cutoff switch 32 is closed, a usual determination is executed, and the failure information is not recorded. Moreover, in the case where the failure information is recorded for only one load 20, the usual determination is executed, and the failure information regarding the load concerned is recorded. However, in the case where the failure information is recorded for a large number of the loads 20, then it is difficult to conceive that the respective failures belong to the large number of loads 20, and it can be said that it is reasonable to determine that the abnormality occurs in the cutoff switch 32. Therefore, the abnormality detecting unit 44 determines that the cutoff switch 32 is abnormal in the case where the failure information is recorded for the large number of the loads 20.

In the case where it is determined that the abnormality does not occur in the cutoff switch 32 (S13: YES), the open/close determining unit 41 determines whether or not the cutoff switch 32 is in the opened state (S14). In the case where it is determined that the cutoff switch 32 is in the opened state (S14: YES), the operation instructing unit 42 transmits the prohibition signal that instructs the prohibition of the failure recording processing (S15). At this time, the operation instructing unit 42 selects the load 20 having the function to perform the failure recording processing, and transmits the prohibition signal thereto.

Thereafter, the master unit 40 determines whether or not there is communication abnormality (S16). This is because, if the communication abnormality occurs, then the prohibition signal transmitted in Step S5 is not received by the load 20, and the failure recording processing is not masked. Note that, in this embodiment, upon receiving the signal from the operation instructing unit 42, the load 20 sends back a signal to the effect of the reception to the master unit 40. Hence, the master unit 40 determines that there is no communication abnormality in the case of receiving such a reply from the load 20, and determines that the communication abnormality occurs in the case of not receiving the reply from the load 20.

In the case where there is no communication abnormality (S16: YES), the recoding prohibiting unit 22 executes the prohibition processing for prohibiting the failure recording processing (S17). In such a way, by pulling out the short-circuit pin 32a in advance, even the load 20 that performs the failure recording processing can cut off the dark current without recording the failure information at the time when the electrical power is not supplied thereto.

Subsequently, the master unit 40 determines whether or not the ignition switch is turned off (S18). In the case where it is determined that the ignition switch is not turned off (S18: NO), the processing proceeds to Step S13. Meanwhile, in the case where it is determined that the ignition switch is turned off (S18: YES), then the processing shown in FIG. 5 and FIG. 6 is ended.

Moreover, in the case where it is determined that the cutoff switch 32 is not in the opened state (S14: NO), the operation instructing unit 42 transmits the usual signal that instructs the usual operation that does not prohibit the failure recording processing (S19). Thereafter, the master unit 40 determines whether or not there is communication abnormality (S20). A method for determining the communication abnormality is the same as that in Step S16.

Then, in the case where there is no communication abnormality (S20: YES), the recording prohibiting unit 22 does not execute the prohibition processing for prohibiting the failure recording processing, but the load 20 executes the usual processing (S21). In such a way, in the case where there is a failure in the load 20 at the time when the vehicle is used by the user, the failure information is recorded by the failure recording unit 21, and at the time when the vehicle is repaired in the dealer or the like, the load 20 which is in the failure can be easily specified from the failure information. Thereafter, the processing proceeds to Step S18 described above.

Incidentally, in the case where there is abnormality in the cutoff switch 32 (S13: NO), the processing proceeds to Step S22 of FIG. 6. Then, the operation instructing unit 42 transmits the usual signal that instructs the usual operation that does not prohibit the failure recording processing (S22). In such a way, the recording prohibiting unit 22 does not execute the prohibition processing for prohibiting the failure recording processing, but the load 20 executes the usual operation (S23).

Here, reasons for executing the usual processing are as follows. In the case where there is abnormality in the cutoff switch 32, the electrical power is not supplied to the load 20. Therefore, at the time of executing the usual processing, the load 20 performs the failure recording processing. In addition, since the cutoff switch 32 is abnormal, the recording of the failure information is performed for the large number of loads 20. In such a way, in the dealer or the like, from the large number of failure information, it can be determined that there occur not the individual failures of the large number of loads 20 but the abnormality of the cutoff switch 32, and exchange, repair and the like of the cutoff switch 32 can be performed.

Thereafter, the processing proceeds to Step S24, and the master unit 40 determines whether or not the ignition switch is turned off (S24). In the case where it is determined that the ignition switch is not turned off (S24: NO), the processing proceeds to Step S22. Meanwhile, in the case where the ignition switch is turned off (S24: YES), the processing shown in FIG. 5 and FIG. 6 is ended.

Moreover, in the case where it is determined that there is communication abnormality in Step S16 and Step S20, which are shown in FIG. 5 (S16, S20: NO), the processing proceeds to Step S25 of FIG. 6. Then, the load 20 determines whether or not the signal that indicates the state of the cutoff switch 32 is unreceived (S25). That is to say, the load 20 determines whether or not to have received the prohibition signal shown in Step S15 or the usual signal shown in Step S19 at least once in the past.

In the case where the signal that indicates the state of the cutoff switch 32 is unreceived (S25: YES), the processing proceeds to Step S22. Meanwhile, in the case where the signal concerned is not unreceived (S25: NO), the failure recording unit 21 holds, as a definite state, the failure information of the load 20 before the communication abnormality occurs (S26). Thereafter, the master unit 40 determines whether or not the ignition switch is turned off (S27). In the case where it is determined that the ignition switch is not turned off (S27: NO), the processing proceeds to Step S26. Meanwhile, in the case where it is determined that the ignition switch is turned off (S27: YES), the processing shown in FIG. 5 and FIG. 6 is ended.

As described above, in accordance with the dark current cutoff device 2 and the dark current cutoff method according to the second embodiment, in the case where it is determine that the cutoff switch 32 is opened, this case is prohibited from being determined and recorded as a failure by the failure recording unit 21. Accordingly, even if the supply of the electrical power to the load 20 that performs the failure recording processing is cut off, the failure recording is not performed, and the operation of deleting the failure information is not required at the time of selling the vehicle. In such a way, the dark current can be cut off also for the load 20 that performs the failure recording processing, and the effect of cutting off the dark current can be enhanced.

Moreover, in the case where the abnormality of the cutoff switch 32 is detected by the abnormality detecting unit 44, the recording prohibiting unit 22 does not execute the operation of prohibiting the failure recording processing. Therefore, as a result that the abnormality of the cutoff switch 32 is erroneously determined as the open of the cutoff switch 32, the failure recording processing is not prohibited in the case where the failure recording processing must be originally performed, and accordingly, the failure recording processing can be normally executed.

Moreover, in the case where the signal from the operation instructing unit 42 does not reach the recording prohibiting unit 22, such recorded contents regarding the failure of the load 20 are held as the definite state. Accordingly, the failure information is not rewritten owing to the communication abnormality, and such an operation of deleting the failure information can be prevented from occurring at the time when of solving the communication abnormality.

Moreover, the cutoff switch 32 is provided, which cuts off the supply of the electrical power to the loads 20 and supplies the electrical power to the loads 20 by pulling out and inserting the short-circuit pin 32a. Accordingly, the dark current can be appropriately cut off in a similar way to the first embodiment.

The description has been made above of the present invention based on the embodiments; however, the present invention is not limited to the above-described embodiments, and may be modified within the scope without departing from the spirit of the present invention.

For example, in the above-described embodiment, with regard to the abnormality detection of the cutoff switch 32 in Step S13 and the communication abnormality detections in Step S16 and Step S20, examples thereof are illustrated; however, other methods known in public may be adopted without being limited to this.

INDUSTRIAL APPLICABILITY

The present invention is usable for the dark current cutoff device and method, which cut off the dark current of the vehicle on which a large number of electrical components are mounted.

REFERENCE SIGNS LIST

1 DARK CURRENT CUTOFF DEVICE
10 BATTERY
20 LOAD
21 FAILURE RECORDING UNIT
22 RECORDING PROHIBITING UNIT
41 OPEN/CLOSE DETERMINING UNIT
42 OPERATION INSTRUCTING UNIT

43 RECORDING PROHIBITING UNIT
44 ABNORMALITY DETECTING UNIT
C ALTERNATIVE ROUTE

The invention claimed is:

1. A dark current cutoff device comprising:
 a battery configured to perform electrical power supply to a load;
 an open/close unit configured to cut off the electrical power supply to the load at a time of being opened, and supply electrical power to the load at a time of being closed, the open/close unit being provided between the battery and the load;
 a failure recording unit configured to determine and record, in a case where the load does not operate, a failure of the load;
 an open/close determining unit configured to determine that the open/close unit is opened;
 a recording prohibiting unit configured to, in a case where the open/close unit is determined to be opened by the open/close determining unit, prohibit the failure recording unit from determining and recording the failure;
 an abnormality detecting unit configured to detect abnormality of the open/close unit; and
 wherein the recording prohibiting unit does not execute an operation of prohibiting the determining and the recording in a case where the abnormality of the open/close unit is detected by the abnormality detecting unit.

2. The dark current cutoff device according to claim 1, further comprising:
 a prohibition instructing unit configured to transmit a signal to prohibit failure recording processing in the case where the open/close unit is determined to be opened by the open/close determining unit,
 wherein the recording prohibiting unit is mounted on the load, and based on a signal from the prohibition instructing unit, prohibits the failure recording unit from determining and recording the failure and,
 the failure recording unit holds, as a definite state, recorded contents regarding the failure of the load in a case where the signal from the prohibition instructing unit does not reach the recording prohibiting unit.

3. The dark current cutoff device according to claim 1, wherein the open/close unit is a cutoff switch configured to cut off the electrical power supply to the load and supply the electrical power to the load by manually pulling out and inserting a short-circuit pin.

4. A dark current cutoff method of a dark current cutoff device including a battery configured to perform electrical power supply to a load, and an open/close unit configured to cut off the electrical power supply to the load at a time of being opened, and supply electrical power to the load at a time of being closed, the open/close unit being provided between the battery and the load, the dark current cutoff method comprising:
 a failure recording step of determining and recording, in a case where the load does not operate, a failure of the load;
 an open/close determining step of determining that the open/close unit is opened;
 a recording prohibiting step of prohibiting, in a case where the open/close unit is determined to be opened in the open/close determining step, the failure recording step from determining and recording the failure;
 an abnormality detecting step of detecting abnormality of the open/close unit; and
 wherein the recording prohibiting step does not execute an operation of prohibiting the determining and the recording in a case where the abnormality of the open/close unit is detected by the abnormality detecting step.

* * * * *